(12) United States Patent
Bofferding et al.

(10) Patent No.: US 10,551,210 B2
(45) Date of Patent: *Feb. 4, 2020

(54) LOCAL ADVERTISEMENT GENERATION AND DISPLAY BASED ON APPLICATIONS

(71) Applicant: International Business Machines Corporation, Armonk, NY (US)

(72) Inventors: Nicholas E. Bofferding, Cedar Park, TX (US); Andrew J. Geissler, Pflugerville, TX (US); Michael C. Hollinger, Austin, TX (US); Adriana Kobylak, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 15/593,928

(22) Filed: May 12, 2017

(65) Prior Publication Data
US 2018/0328754 A1 Nov. 15, 2018

(51) Int. Cl.
| H04L 29/06 | (2006.01) |
| G01C 21/36 | (2006.01) |
| H04W 12/06 | (2009.01) |
| H04L 29/08 | (2006.01) |
| H04W 4/02 | (2018.01) |
| G06Q 30/02 | (2012.01) |

(52) U.S. Cl.
CPC ..... *G01C 21/3679* (2013.01); *G06Q 30/0266* (2013.01); *H04L 63/083* (2013.01); *H04L 65/60* (2013.01); *H04L 67/12* (2013.01); *H04L 67/306* (2013.01); *H04W 4/02* (2013.01); *H04W 12/06* (2013.01)

(58) Field of Classification Search
None
See application file for complete search history.

(56) References Cited

U.S. PATENT DOCUMENTS

| 7,689,355 | B2 | 3/2010 | Abernethy, Jr. et al. |
| 8,402,134 | B1 * | 3/2013 | Hir .................. H04W 12/1206 709/224 |
| 8,660,894 | B2 | 2/2014 | O'Sullivan et al. |
| 8,688,532 | B2 | 4/2014 | Khunger et al. |

(Continued)

OTHER PUBLICATIONS

Computer Desktop Encyclopedia definition of "processor": http://lookup.connputerlanguage.com/host_app/search?cid=C999999&term=processor&lookup.x=0&lookup.y=0 (Year: 2014).*

(Continued)

*Primary Examiner* — Jeremiah L Avery
(74) *Attorney, Agent, or Firm* — Lieberman & Brandsdorfer, LLC

(57) ABSTRACT

Dynamic message selection and presentation based on integration of data from two or more applications is provided. Data from two or more applications on a first device is integrated utilizing an authentication token associated with the first device. Responsive to a real-time message request associated with an application, a data storage having one or more messages is interrogated. A first message from the interrogated data storage is selected and presented in real-time based on the message request, route traversal information from a first application, and profile data associated with a second application.

13 Claims, 6 Drawing Sheets

(56) References Cited

U.S. PATENT DOCUMENTS

| | | | | |
|---|---|---|---|---|
| 2003/0046589 | A1* | 3/2003 | Gregg | G06F 21/335 726/5 |
| 2007/0060099 | A1* | 3/2007 | Ramer | G06Q 30/02 455/405 |
| 2007/0060136 | A1* | 3/2007 | Ramer | G06Q 30/02 455/445 |
| 2007/0061363 | A1* | 3/2007 | Ramer | G06Q 30/02 |
| 2008/0262990 | A1* | 10/2008 | Kapoor | G06F 9/505 706/20 |
| 2009/0157499 | A1 | 6/2009 | Panabaker et al. | |
| 2010/0069035 | A1* | 3/2010 | Johnson | H04W 92/18 455/404.1 |
| 2011/0040626 | A1 | 2/2011 | Lin | |
| 2011/0177799 | A1* | 7/2011 | Ramer | G06Q 30/02 455/414.1 |
| 2012/0190386 | A1* | 7/2012 | Anderson | G01C 15/04 455/456.3 |
| 2014/0053255 | A1* | 2/2014 | Lindteigen | H04L 63/0815 726/8 |
| 2015/0254581 | A1 | 9/2015 | Brahme | |
| 2015/0348112 | A1 | 12/2015 | Ramanujam | |
| 2016/0294605 | A1* | 10/2016 | Searle | H04L 41/082 |
| 2016/0320198 | A1 | 11/2016 | Liu et al. | |
| 2016/0343032 | A1* | 11/2016 | DeWitt | G06Q 30/0261 |

OTHER PUBLICATIONS

Dujlovic, Igor; Duric, Zoran. Cross-platform Web based Real-time Communication in Web Tv and Video on Demand Systems. 2015 57th International Symposium ELMAR. https://ieeexplore.ieee.org/stamp/stamp.jsp?tp=&arnumber=7334497 (Year: 2015).*

Pallickara, Shrideep et al. A Framework for Secure End-to-End Delivery of Messages in Publish/Subscribe Systems. 2006 7th IEEE/ACM International Conference on Grid Computing. https://ieeexplore.ieee.org/stamp/stamp.jsp?tp=&arnumber=4100475 (Year: 2006).*

Chen, Nan et al. Mobile Cloud based System Architecture for Remote-Resident Multimedia Discovery and Access. 2013 10th Web Information System and Application Conference. https://ieeexplore.ieee.org/stamp/stamp.jsp?tp=&arnumber=6778665 (Year: 2013).*

Chiba, Tsunehiko et al. Route Optimization for Proxy Mobile IPv6 in IMS Network. 2008 2nd International Conference on Signal Processing and Communication Systems. https://ieeexplore.ieee.org/stamp/stamp.jsp?tp=&arnumber=4813675 (Year: 2008).*

Malladi, Srilaxmi et al. Improving Secure Communication Policy Agreements by Building Coalitions. 2007 IEEE International Parallel and Distributed Processing Symposium. https://ieeexplore.ieee.org/stamp/stamp.jsp?tp=&arnumber=4228350 (Year: 2007).*

Crum, Uber Adds Pandora Access into Drivers' Ride Information App, Bay Area News Group, Jun. 27, 2016.

* cited by examiner

LOCAL ADVERTISEMENT GENERATION AND DISPLAY BASED ON APPLICATIONS

BACKGROUND

The present embodiments relate to message selection and presentation. More specifically, the embodiments relate to integration of data from two applications.

Ride sharing applications known in the art as physical routing navigation service application (PRNS) for ride sharing facilitate ride hailing service(s). Use of such applications integrates transportation services between a driver and a rider. Both the rider and the driver interface with the PRNS application through their respective devices. Specifically, a driver having an account established in the application may set their status between active and inactive. A rider with an established account utilizes their device having the PRNS application to request a ride from a driver who has a corresponding PRNS application on a second device set to the active status. The ride request includes a source location and a destination location. The PRNS application calculates a route for the ride request and the driver may accept or decline the ride request through the corresponding PRNS application.

Upon acceptance between the drive and the ride, the driver utilizes a vehicle to transport the rider from the source location to the target location along a selected path. The PRNS application is provided with a plurality of features to enhance the ride sharing experience. For example, the rider may request a quantity of passengers in the vehicle, the rider may request the vehicle type, and the rider may control a playlist of the music in the vehicle utilizing the second device.

SUMMARY

A system and computer program product are provided for selection and presentation of a message based on data integrated from at least two applications.

In one aspect, a system is provided with a processing unit in communication with memory, and a message selector in communication with the processing unit. The message selector integrates data from first and second applications on a first device utilizing an authentication token associated with the first device. The integration includes gathering route traversal information in real-time from the first application including a current location, and gathering profile data associated with the second application on the first device utilizing the token to access the data. Responsive to a real-time message request associated with the second application, the message selector interrogates a data storage having one or more messages. A first message from the interrogated data storage is selected in real-time based on the message request, the route traversal information, and the profile data. The first and/or a second device present the selected first message in the second application.

In another aspect, a computer program product is provided for integrating data from two or more applications for message selection and presentation. The computer program product includes a computer readable storage medium with embodied program code that is configured to be executed by a processing unit. Program code integrates data from both first and second applications on a first device utilizing an authentication token associated with the first device. The integration includes gathering route traversal information in real-time from the first application including a current location and gathering profile data associated with the second application on the first device utilizing the token to access the data. Responsive to a real-time message request associated with the second application, program code interrogates a data storage having one or more messages. Program code selects, in real-time, a first message from the interrogated data storage based on the message request, the route traversal information, and the profile data. Program code presents the selected first message in the second application on the first and/or second device.

In yet another aspect, a method is provided for selection and presentation of a message based on data integrated from two applications. Data from a first and second application on a first device is integrated utilizing an authentication token associated with the first device. The integration includes gathering route traversal information in real-time form the first application including a current location and gathering profile data associated with the second application on the first device utilizing the token to access the data. Responsive to a real-time message request associated with the second application, a data storage having one or more messages is interrogated. A first message from the interrogated data storage is selected in real-time based on the message request, the route traversal information, and the profile data. The selected first message is presented in the second application on the first and/or second device.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
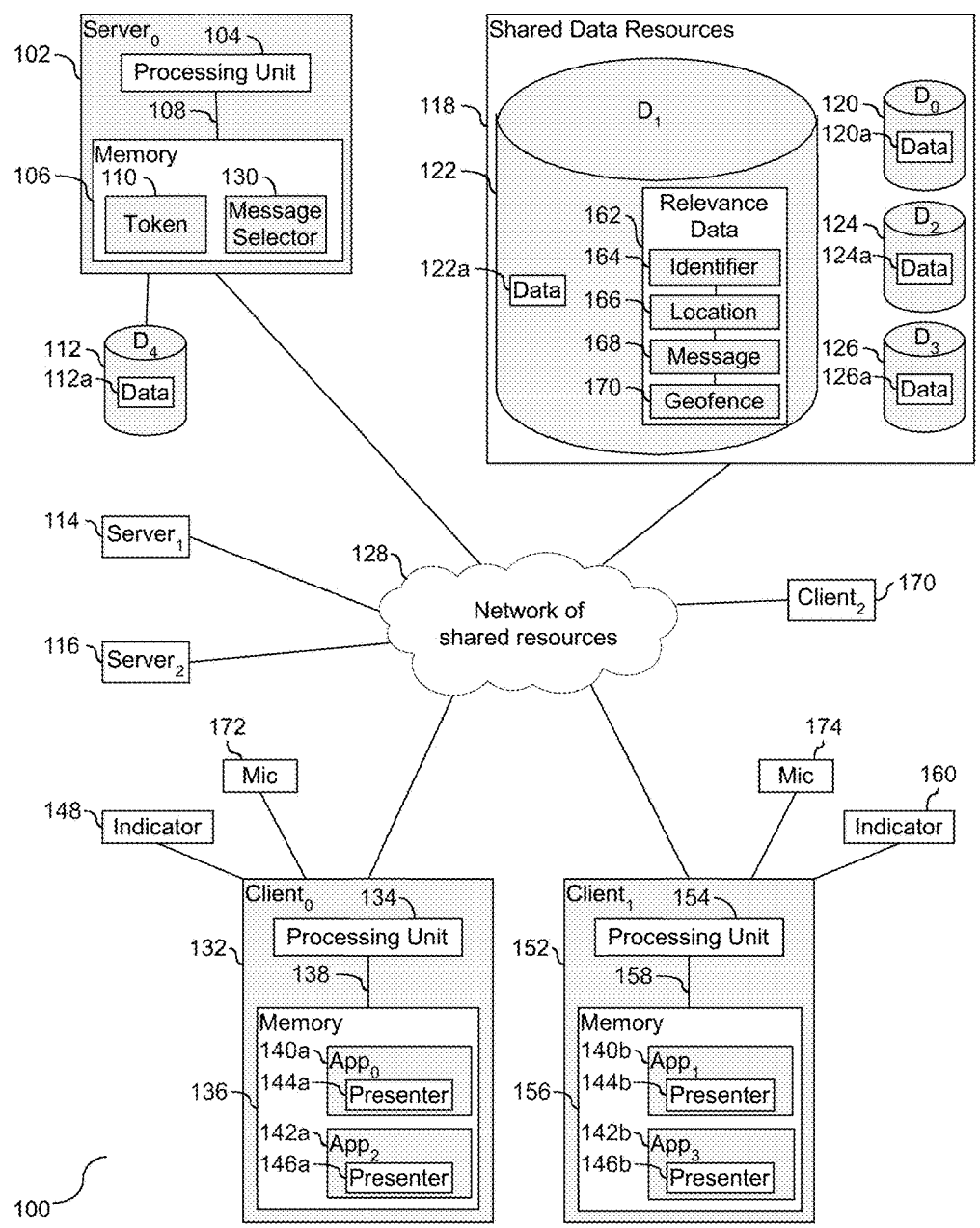
FIG. 1 depicts a block diagram illustrating a computer system with tools to support selection and presentation of a message based on data integrated from two or more applications.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Mobile computing devices, such as tablets and smartphones, supports multiple applications. Each of these applications has different functions and services. For example, a physical routing navigation service application (PRNS) may be employed for physical transportation from a source location to a destination location. Similarly, a map application may be employed to facilitate guidance between the source and destination locations. For example, one route may avoid tolls, another route may avoid excessive traffic while being subject to tolls. There are many applications available for use on mobile computing devices, with the selection customizable per device by needs and interest.

Another example of an application is referred to as a music streaming (MS) application, which functions to continuously transmit music from a server to be received by the mobile device for immediate playback. It is known in the art of music that the selection of musical pieces may bring joy and/or relaxation to the listener. Some listeners select music to relieve stress, while other listeners select music to add energy to an associated event. Integration of the MS application with a second application may enhance an associated experience. Integration of the MS application with a second application may enhance an associated experience by adding the extra dimension of music.

Use of the PRNS application may identify more than one driver available in the vicinity for the requested transportation service. In such circumstances, the rider has the ability to select the driver. Selection may be based on prior transportation with the driver by the rider or perhaps a rating provided by a prior rider. Regardless of the criteria employed for driver selection, it may be desirable to enhance the riding experience for the rider. Integration of the MS application with the PRNS application may provide such an enhancement. However, it is understood that since the MS application and PRNS application are separate and distinct, they may not share data between each other. Accordingly, an interface between such separate and distinct applications may be required to support integration of the application functionalities.

The MS application may be free to download and use. However, in order for the MS application provider to generate revenue, after a predetermined quantity (e.g. time, songs, etc.) of music has been streamed to the mobile device and played, the MS application transmits and presents a message (e.g. advertisement) for an entity that has contracted to pay for message services (e.g. advertising services) with the MS application provider. The message may be audible, visual, haptic, and/or combinations thereof.

When the MS application determines a time to play a message the MS application selects the message based on the data associated solely with the MS application (e.g. attributes associated with providers and data associated with the mobile device) and presents the message on a device. Increasing the data accessible to the MS application will increase the contextually relevance of the message selected and presented to the user of the device.

A system, method, and computer program product are disclosed and described herein to integrate data from two or more applications with the integration to enable targeted message selection and presentation. The message is media including but not limited to, an image, a video, an audio, a short message service (SMS), and combinations of the foregoing. The message is a communication protocol that is employed as a form of communication. The communication may in the form of a visual presentation, an audio presentation, and a haptic presentation. An authentication token is utilized to integrate data from the two or more applications. The integrated data includes route traversal information gathered in real-time from a first application utilizing the authentication token and profile data associated with a second application gathered utilizing the authentication token. A real-time message request is received and data storage is interrogated. The interrogation of the data storage includes selecting, in real-time, a first message based on the message request, the route traversal information, and the profile data. The selected messaged is presented on the mobile device associated with the user.

Referring to FIG. 1, a block diagram (100) is provided illustrating a computer system that supports integration from two or more applications, and more specifically, selection and presentation of a message based on data integrated from the two or more applications. A server, server$_0$ (102), is shown configured with a processing unit (104) in communication with a memory (106) across a bus (108). Server® (102) is also shown in communication with a network of shared resources (128) across a network connection to provide access to shared resources, including, but not limited to, shared data resources (118), client devices, client$_0$ (132), client$_1$ (152), and client$_2$ (170), and other servers, server$_1$ (114) and server$_2$ (116). The quantity of client devices, servers, and data resources shown and described herein are for illustrative purposes and should not be considered limiting.

Server$_0$ (102) is operatively coupled to local data storage, D$_4$ (112). Similarly, shared data resources (118) is configured with data storage, D$_0$ (120), D$_1$ (122), D$_2$ (124), and D$_3$ (126). Server$_0$ (102) is configured with message selector (130) and an authentication token (110). As shown, the message selector (130) is stored in memory (106) for execution by processing unit (104), although in one embodiment, the message selector (130) may be in the form of an application operatively coupled to the memory (106) for execution by the processing unit (104). The message selector (130) is in communication with local data storage, D$_4$ (112). In one embodiment, the message selector (130) is in communication with shared data resources (118), including D$_0$ (120), D$_1$ (122), D$_2$ (124), and D$_3$ (126). Message selector (130) may be located on a client device, such as client$_0$ (132) or another server, such as server$_1$ (114). Accordingly, the location of data storage D$_0$ (120), D$_1$ (122), DS$_2$ (124), DS$_3$ (118), and DS$_4$ (112) and the location of message selector (130) shown herein is for illustrative purposes and should not be considered limiting.

Client$_0$ (132), is shown configured with a processing unit (134) in communication with a memory (136) across a bus (138). Client$_0$ (132) is also shown in communication with a network of shared resources (128) across a network connection to provide access to shared resources, including, but not limited to, shared data resources (118). As shown, applications, app$_0$ (140a) and app$_2$ (142a) are stored in memory (136) for execution by processing unit (134), although in one embodiment, app$_0$ (140a) and app$_2$ (142a) may be operatively coupled to the memory (136) for execution by the processing unit (134). Client$_0$ (132) is configured with one or more indicators, such as indicator (148) and a microphone (172). Indicator (148) may be, but is not limited to, a visual display, a speaker, a light emitting diode (LED), and a haptic device. The indicator (148) may be controlled by app$_0$ (140a) and/or app$_2$ (142a) located within memory (136). Similarly, client$_1$ (152), is shown configured with a processing unit (154) in communication with a memory (156) across a bus (158). Client$_1$ (152) is also shown in communication with a network of shared resources (128) across a network connection to provide access to shared resources, including, but not limited to, shared data resources (118). As shown, applications, app$_1$ (140b) and app$_3$ (142b) are stored in memory (156) for execution by processing unit (154), although in one embodiment, app$_1$ (140b) and app$_3$ (142b) may be operatively coupled to the memory (156) for execution by the processing unit (154). Client$_1$ (152) is configured with one or more indicators, such as indicator (160) and a microphone (174). Indicator (160) may be, but is not limited to, a visual display, a speaker, an LED, and a haptic device. The indicator (160) may be controlled by app$_1$ (140b) and/or app$_3$ (142b) located within memory (156). Accordingly, client devices, client$_0$ (132) and client$_1$ (152), are provided with application(s) stored in memory that are configured to control an indicator associated with the respective client device.

Each data storage, D$_0$ (120), D$_1$ (122), D$_2$ (124), D$_3$ (126), and D$_4$ (112) is configured with data to support the use of one or more applications. For example, D$_0$ (120) is configured with data (120a), D$_1$ (122) is configured with data (122a), D$_2$ (124) is configured with data (124a), D$_3$ (126) is configured with data (126a), and D$_4$ (112) is configured with data (112a). Data (112a), (120a), (122a), (124a), and (126a) supports one or more applications on client devices, such as client$_0$ (132) and client$_1$ (152), and/or servers, such as server$_0$ (102), server$_1$ (114), server$_2$ (116). The supported applications may be application, app$_0$ (140a), app$_1$ (140b), app$_2$ (142a), app$_3$ (140b), and app$_4$ (not shown). Accordingly, each data storage has respective data to support application(s).

In one embodiment, one or more relevance data, such as relevance data (162) are embedded in D$_1$ (122) to support a selection of a message by message selector (130). Relevance data (162) is configured with an entity identifier (164), an entity geographic location (166), a message (168) associated with the entity, and a geofence (170) associated with the entity. In one embodiment, the entity is a business or some form of a commercial entity. An entity identifier (164) may be, but is not limited to, a name of a business, corporation, association, and non-profit. The entity geographic location (166) is a reference for the physical location of the entity, such as a store that sells products corresponding to the entity. In one embodiment, the entity geographic location (166) is a set of coordinates corresponding to the longitude and latitude of the physical location. The message (168) is media including but not limited to, an image, a video, an audio, and combinations of the foregoing. The geofence (170) is a virtual geographic boundary that creates a virtual perimeter for a physical geographic area. Accordingly, relevance data (162) includes information defining the location of an entity which may be used to support selection of a message.

It is understood that applications (140a)-(142b) may be the same application or a different application and the applications (140a)-(142b) may be different versions of the same application. For example, app$_0$ (140a) may be a physical route navigating service (PRNS) application, and app$_2$ (142a) may be a music streaming (MS) application. Similarly, app$_1$ (140b) may be a PRNS application and app$_2$ (142a) may be a MS application. Each application app$_0$ (140a), app$_1$ (140b), app$_2$ (142a), and app$_3$ (140b) is associated with data for the entity accessing the application. For example, data associated with client$_0$ (132) and app$_0$ (140a) is stored as data (120a), and data associated with client$_0$ (132) and app$_2$ (142a) is stored as data (124a). Similarly, data associated with client$_1$ (152) and app$_3$ (142b) is stored as data (126a). In one embodiment, data (112a), (120a), (122a), (124a), and (126a) is secured data which requires authentication prior to access of the data. Accordingly, the applications, app$_0$ (140a), app$_1$ (140b), app$_2$ (142a), and app$_3$ (140b) are supported by data stored in data storage.

As shown, access to secured data (112a), (120a), (122a), (124a), (124a), and (126a) may require authentication by the accessing entity. Token (110) is configured to facilitate authentication of one or more applications, such as app$_0$ (140a), app$_1$ (140b), app$_2$ (142a), and/or app$_3$ (142b). For example, app$_0$ (140a) provides authentication credentials corresponding for client$_0$ (132) (e.g. user name and password) to token (110). The identity of client$_0$ (132) is associated with app$_0$ (140a) by the token (110) responsive to the receipt of the credentials. The token (110) and the association enable app$_0$ (140a) to obtain access to secured data (120a) that is associated with client$_0$ (132). App$_2$ (142a) does not have access to secured data (120a) without authentication. However, token (110) is configured to provide an identity authentication to two or more applications, such app$_0$ (140a), app$_1$ (140b), app$_2$ (142a), and/or app$_3$ (142b). For example, applications, app$_0$ (140a) and app$_2$ (142a), may provide authentication credentials for client$_0$ (132) to token (110). Token (110) verifies the authentication credentials provided by app$_0$ (140a) and app$_2$ (142a) and associates both app$_0$ (140a) and app$_2$ (142a) with the identity of client$_0$ (132). The secure data associated with client$_0$ (132) through app$_0$ (140a), such as data (120a), may be shared with app$_2$ (142a) by utilizing the token (110). Similarly, the secured data associated with client$_0$ (132) through app$_2$ (142a), such as data (124a) may be shared with app$_0$ (140a) by utilizing the token (110). In one embodiment, app$_0$ (140a) transmits an association request to app$_1$ (142b) which accepts the association request. Upon acceptance of the association request, app$_1$ (142b) is also associated with token (110) and provided access to secured data (120a) and in one embodiment, secured data (124a). Accordingly, the token (110) facilitates authentication of client identity for accessing secured data and integration of the secured data between one or more applications associated with the client.

Each application, app$_0$ (140a), app$_1$ (140b), app$_2$ (142a), and/or app$_3$ (142b), may be configured with a coupon presenter. For example, app$_0$ (140a) is configured with coupon presenter (144a), app$_1$ (140b) is configured with coupon presenter (146a), app$_2$ (142a) is configured with coupon presenter (144b), and app$_3$ (140b) is configured with coupon presenter (146b). Each coupon presenter, (144a)-(146b), can receive a message from message selector (130) and present the message on the respective indicator (148). The message may include a coupon with an embedded identifier (e.g. QR code, barcode, etc.) that is used by an entity to associate the message with the coupon. The embedded identifier facilitates tracking of how many users were influenced by the message. Each coupon presenter, (144a)-(146b), may indicate the receipt of a coupon utilizing respective indicators (148) and (160) by providing a vibration, an indicator light (e.g. LED), a visual presentation, an audible indicator, or a combination of two or more indicators. Accordingly, the application(s) may present and indicate receipt of the message(s) including coupon(s).

Each application, $app_0$ (140a), $app_1$ (140b), $app_2$ (142a), and/or $app_3$ (142b) is provided with functionality to transmit a message request to message selector (130) in real-time. The message request may be based on the real-time identification of an event. For example, an event may be when $client_0$ (132) identifies a keyword utilizing microphone (172). For example, microphone (172) may be active and receive an audible phrase such as "I want coffee." A keyword may be stored in data (122a) and linked to an entity identifier, such as identifier (164). For example, in one embodiment, entity identifier (164) is "Starbucks" and data (122a) includes the keyword "coffee" linked to relevance data (162). Additionally, an event may be, but is not limited to, when an application, such as $app_0$ (140a), $app_1$ (140b), $app_2$ (142a), and/or $app_3$ (142b), determines a message should be requested based on a time interval, location of the requesting device, speed of the requesting device, and other interrupting event. An event based on the time interval, may be, but is not limited to, based on a frequency of when a message is presented (e.g. every 15 minutes) and/or a completion percentage of the route (e.g. half-way to the target location). An event based on the speed of the requesting device may include when the speed of the device is stopped, below a predefined speed, and/or above a predefined speed. An event based on the location of the device may be, but is not limited to, when the device engages and/or enters a geofence, the device is proximally positioned to an entity, and a distance to/from the source/target location. Based on the event determination, the requesting application, $app_0$ (140a), $app_1$ (140b), $app_2$ (142a), and/or $app_3$ (142b), transmits a message request to message selector (130). The message request includes an instruction for message selector (130) to select a contextually relevant message for the respective client device and to transmit the message to the requesting application. Accordingly, an application transmits a message request to message selector (130) in real-time.

Message selector (130) is in communication with token (110) and is able to access secured data associated with a client device requesting the message. For example, $app_0$ (140a) and $app_2$ (142a) have provided authentication credentials to token (110), and token (110) associates $app_0$ (140a) and $app_2$ (142a) with the identity of $client_0$ (132). Responsive to the authentication credentials, token (110) enables the applications, $app_0$ (140a) and $app_2$ (142a), to access the secured data of each application, $app_0$ (140a) and $app_2$ (142a). For example, secure data (120a) corresponds to $app_0$ (140a) and secure data (124a) corresponds to $app_2$ (142a). Both secure data (120a) and secure data (124a) are accessible by both applications $app_0$ (140a) and $app_2$ (142a). $App_0$ (140a) transmits a message request to message selector (130) through the network of shared resources (128) in real-time responsive to an event.

Message selector (130) receives the transmitted message request and message selector (130) interrogates $D_1$ (122). The message interrogation includes determining the contextual relevance of one or more messages in $D_1$ (122), such as message (168) to the event and the requesting device. To determine the contextual relevance, the message selector (130) utilizes the token (110) to access and gather secured data, such as data (120a) and/or data (124a). The message selector (130) is configured to gather route traversal information from an application, such as $app_0$ (140a), from the client device, such as $client_0$ (134), $client_1$ (152), and/or $client_2$ (170), with the gathered data including extraction of a current location from the client device. The message selector (130) compares the gathered data to relevance data (162) and/or data (122a) to the route traversal information and gathered secured data and route traversal information to determine a message contextually relevant to a client device. The contextually relevant message is dynamically selected by the message selector (130) in real-time responsive to the receipt of the message request. For example, if the event was based on a keyword of "I want coffee" and data (122a) included a keyword of "coffee" associated with identifier (164) which is "Starbucks", message (168) associated with identifier (164) would be selected.

After the selection of the message, message selector (130) retrieves the message from $D_1$ (122) and transmits the message to the requesting application. In one embodiment, the transmission of the message is from message selector (130) to $client_0$ (132). In one embodiment, the transmission of the message is from message selector (130) is to $client_1$ (152). The transmitted message is received by the requesting application and presented on the respective indicator, such as indicators (148) and (160). The presentation may be but is not limited to, visual, audible, and haptic. In one embodiment, the message includes a coupon. The coupon is presented by a coupon presenter (144a), (144b), (146a), and (146b). Accordingly, a contextually relevant message is dynamically selected in real-time from data storage and presented on a client device.

Figure 2:
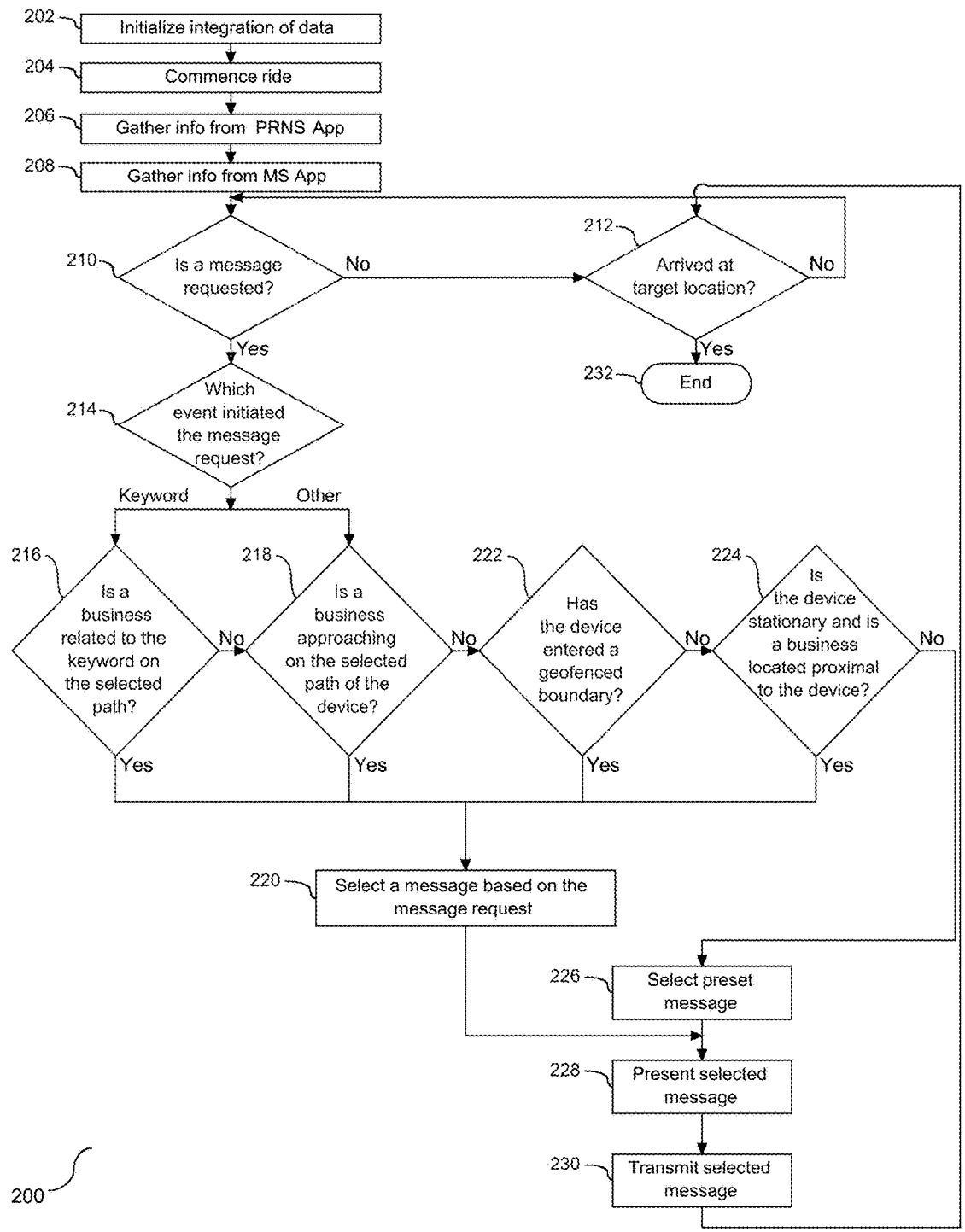
FIG. 2 depicts a flow chart illustrating integrating data from two applications.

Referring to FIG. 2, a flow chart (200) is provided illustrating a process for integrating data from two applications to present a message to a user or a mobile device associated with the user. As shown, an entity (e.g. user) has provided authentication credentials to both a music streaming (MS) application and a physical routing navigating service (PRNS) application on a first device which enables initialization of data integration (202). The first device may be a client device, a server, or similar device. Providing authentication credentials to both the MS application and the PRNS application includes utilizing one authentication token to facilitate sharing of data between the PRNS application and the MS application. Following the initialization of the data integration, the PRNS application is activated and utilized to commence a chauffeured ride (204). For instance, the commencement of the chauffeured ride includes a ride request from a source location to a target location from the PRNS application on the first device and an acceptance of the request from a PRNS application on a second device. The acceptance of the ride request associates the PRNS application on the second device with the authentication token. The commencement of the chauffeured ride includes the first device and second device being located proximal to each another. In one embodiment, the first and second devices are in the same vehicle, such as an automobile. The chauffeured ride includes a first user (e.g. rider) associated with the first device and a second user (e.g. driver) associated with a second device traveling along a selected path from a source location to a target location together. Accordingly, the chauffeured ride has commenced utilizing the PRNS application(s).

Following commencement of the chauffeured ride, data, such as route traversal information, is gathered from the PRNS application in real-time from the first and/or second device (206). The gathering includes utilizing the token to access the PRNS application and to extract a current location associated with the first device. The current location may be extracted from the first device and/or the second device since both devices are traveling along the path together the physical location of either device may be used as the current location associated with the first device. In one embodiment, the gathering of the route traversal information is a continuous background process on the first device and/or the second device. The route traversal information, may include, but is not limited to, a current location, a source location, a target location, a selected path from the source to target location for the chauffeured ride to take, and a re-routed path from a second location to the target location. Accordingly, route traversal information is gathered in real-time utilizing the authentication token.

Profile data of the first user is gathered from the MS application utilizing the token (208). The gathering includes utilizing the authentication credentials provided to the token to access secured data including the profile data associated with the user of the first device (e.g. mobile computing device), also referred to herein as a first user. The profile data may include a demographic of the first user, a previous location of the first device, and a preferred location of the first device (e.g. a location the first device is frequently present at). In one embodiment, profile data of the second user may be accessed via authentication credentials provided to a second token associated with the second user. It is understood that the MS application on the first device may stream music through the second device utilizing the PRNS application and the token. In one embodiment, the second device is connected to the sound system of the vehicle and both the first and second users hear the audible sound from the sound system of the vehicle produced by the MS application on the second device. In one embodiment, a playlist controlling the audible sound produced by the second device is controlled by the MS application on the first device. Accordingly, the profile data is gathered utilizing the same authentication token utilized to gather the route traversal information.

Following gathering of data at steps (206) and (208), the process determines if a message has been requested (210). A message may be requested for a variety of events that may occur. For example, an event may be when the first and/or second device (e.g. requesting device) identifies a keyword (e.g. input via a keyboard and/or audible keyword received by an active microphone). In response to the keyword, the requesting device may transmit a message request. A keyword database may be stored on the requesting device or a server which is used by the requesting device when making a determination that a keyword was received. Additionally, an event may be requested when the MS application from the requesting device determines an event based on, but not limited to, a time interval, a location of the requesting device event, a speed of the requesting device event, and other interrupting event(s). If a message request has been received the process proceeds to step (214). However, if a message request has not been received, a determination is made if the first device has arrived at the target location (212). The determination at step (212) is based on a current location associated with the first device based on the physical location extracted from the first device and/or the second device. If the determination at step (212) is positive and the first device has arrived at the target location the process concludes (232). However, if the device has not arrived at the target location, the process returns to step (210) to determine if a message request has been received. In one embodiment, step (210) includes continuously monitoring for receipt of a message request. Accordingly, receipt of the request is monitored, including the event that initiated the request.

Following a positive determination at step (210), a subsequent determination is made of which event initiated the message request (214). If the message requested was determined to be based on an event that identified the keyword, a determination is made of whether a commercial entity is related to the keyword on the selected path (216). The determination includes a comparison of the route traversal information to a data storage containing one or more businesses having one or more associated keywords. The comparison includes determining the commercial entity that is associated with the identified keyword. If a matching commercial entity is found associated with the keyword at step (216), the process proceeds to step (220) for message selection. However, following a negative determination at step (216) and other event type determination at step (214), a determination is made of whether the location of the device is approaching the commercial entity (218). The determination includes a comparison of the route traversal information to the data storage containing one or more commercial entities. The comparison includes determining the commercial entity that is proximally positioned to the selected path untraversed by the current location associated with the first device, including a comparison of the physical location of the commercial entity as defined in the data storage to the current location associated with the first device. If the determination is positive at step (218) and a matching commercial entity is found that is approaching on the selected path, the process proceeds to step (220) for message selection. If a matching commercial entity is not found at step (218), the process proceeds to step (222). Accordingly, the database of one or more commercial entities is searched in response to a keyword event and other event types to determine business that are contextually relevant to the event.

Following a negative determination at step (218), a determination is made of whether the current location associated with the first device has entered a geofence boundary (222). The determination includes a comparison of the route traversal information to the data storage containing one or more commercial entities including one or more geofence boundaries. The comparison includes determining a geofence boundary that the current location associated with the first device has entered (e.g. the current location is contained within the geofence). If a matching geofence boundary is found at step (222), the process proceeds to step (220) for message selection. Following a negative determination at step (222), a determination is made of whether the current location associated with the first device is stationary (224). The device may be stationary when the vehicle has stopped traversing along the selected path. In one embodiment, the vehicle is at an intersection. The determination at step (224) includes a comparison of the route traversal information to the data storage containing one or more commercial entities. The comparison includes determining the commercial entity that is located proximal to the current location associated with the first device. In one embodiment, the comparison includes determining the commercial entity that is located proximal to an intersection with proximally positioned to the current location associated with the first device. If a matching business is found at step (224), the process proceeds to step (220) for message selection. Following a negative determination at step (224), the data storage is interrogated and a predefined message is selected from the data storage (226). Accordingly, the event is evaluated to determine contextual relevance to messages in the data storage and if a contextually relevant message cannot be determined a predefined message is selected that may not be contextually relevant to the first and/or second devices.

However, following a positive determination at steps (216), (218), (222), or (224), a contextually relevant message is dynamically determined and selected in real-time based on the message request, the route traversal information, and the account profile associated with the user of the first device. The dynamic selection in real-time at step (220) is based on an interrogation of the data storage associated with the location, business, and/or geofence boundary found to be contextually relevant at steps (216), (218), (222), and/or (224). The interrogation includes a comparison of the data storage to the gathered route traversal information, the profile data associated with the first user of the first device, and the message request in order to dynamically determine a contextually relevant message for selection. In one embodiment, the selection at step (220) is a dynamic determination of the most contextually relevant message present in the data storage. In one embodiment, the selection at step (220) utilizes profile data associated with the second user associated with the second device in the dynamic determination. Accordingly, a contextually relevant message is dynamically determined and selected based on a comparison of the data storage to the gathered data.

Following dynamic selection in real-time of the message at step (220) and (226), the message is transmitted to the first device (228) and or in one embodiment the second device. Following receipt of the transmitted message, the message is presented to the first user via the first device (230) and/or via the second device. For example, the presentation may be audio sound from the MS application on the first device. In one embodiment, the presentation may be audible sound from the sound system of the vehicle produced by the MS application on the second device. The presentation may be a visual message, such as a video and/or image on a visual display local to the first and/or second device. The presentation may include the use of an LED and/or a haptic device to alert the first user to the presence of the message. The presentation may include a visual presentation of coupon on the first device. The coupon may be identified at the commercial entity associated with the message and in one embodiment, redeemed for a discount on a product and/or service. The coupon may include an identifier, a QR code, a barcode, or other form of identification. The identifier may be used by the business to identify the message that was presented. Accordingly, the integrated route traversal information and profile data are utilized to dynamically determine a contextually relevant message for presentation.

Figure 3:
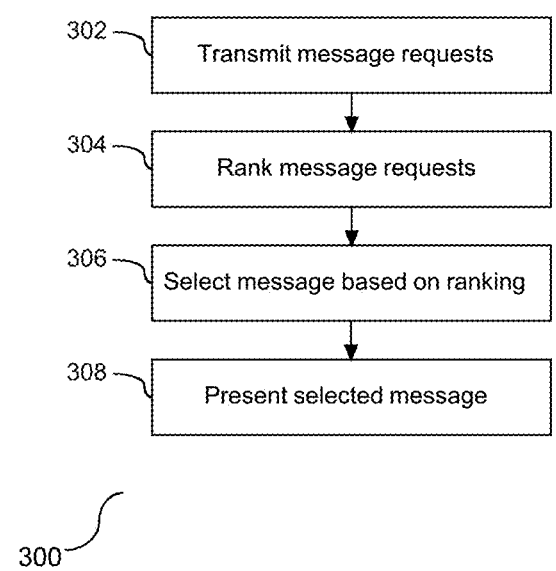
FIG. 3 depicts a flow chart illustrating ranking of multiple message requests.

Referring to FIG. 3 a flow chart (300) is provided illustrating a process for ranking multiple message requests. As shown, at least two message requests have been transmitted (302). The message requests could be from the same device or from multiple devices. For example, a first device could have a keyword based event and a time based event. In one embodiment, the first device has two keyword based events. In one embodiment, the first device (e.g. first rider), a second device (e.g. driver), and a third device (e.g. second rider) may all request a message to be presented based on the same event, different events, or combinations thereof. Following, receipt of multiple message requests, the message requests are dynamically ranked in real-time based on the profiles of the first and second user, route traversal information, and the event the within each message request (304). The ranking includes a comparison of each message request and the corresponding profile associated with the user of the requesting device to relevant data in data storage including one or more businesses to determine a relevance score. A message is dynamically selected based on the ranking (306). For example, the message may be selected based on the relevance score. Or in one embodiment, the message may be selected based on an aggregate of one or more relevance scores of multiple messages. The selected message is presented on the respective device associated with the first user, second user, and/or third user (308). Accordingly, multiple events may be received and ranked in order to dynamically determine a contextually relevant message.

Aspects of selection and presentation of one or more messages based on data integrated from two applications shown and described in FIGS. 1-3 employ one or more functional tools. In one embodiment, the functional tools are within a functional unit. Aspects of the functional tool, e.g. message selector, and its associated functionality may be embodied in a computer system/server in a single location, or in one embodiment, may be configured in a cloud based system sharing computing resources. With references to FIG. 4, a block diagram (400) is provided illustrating an example of a computer system/server (402), hereinafter referred to as a host (402) in communication with a cloud based support system, to implement the processes described above with respect to FIGS. 1-3. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

Figure 4:
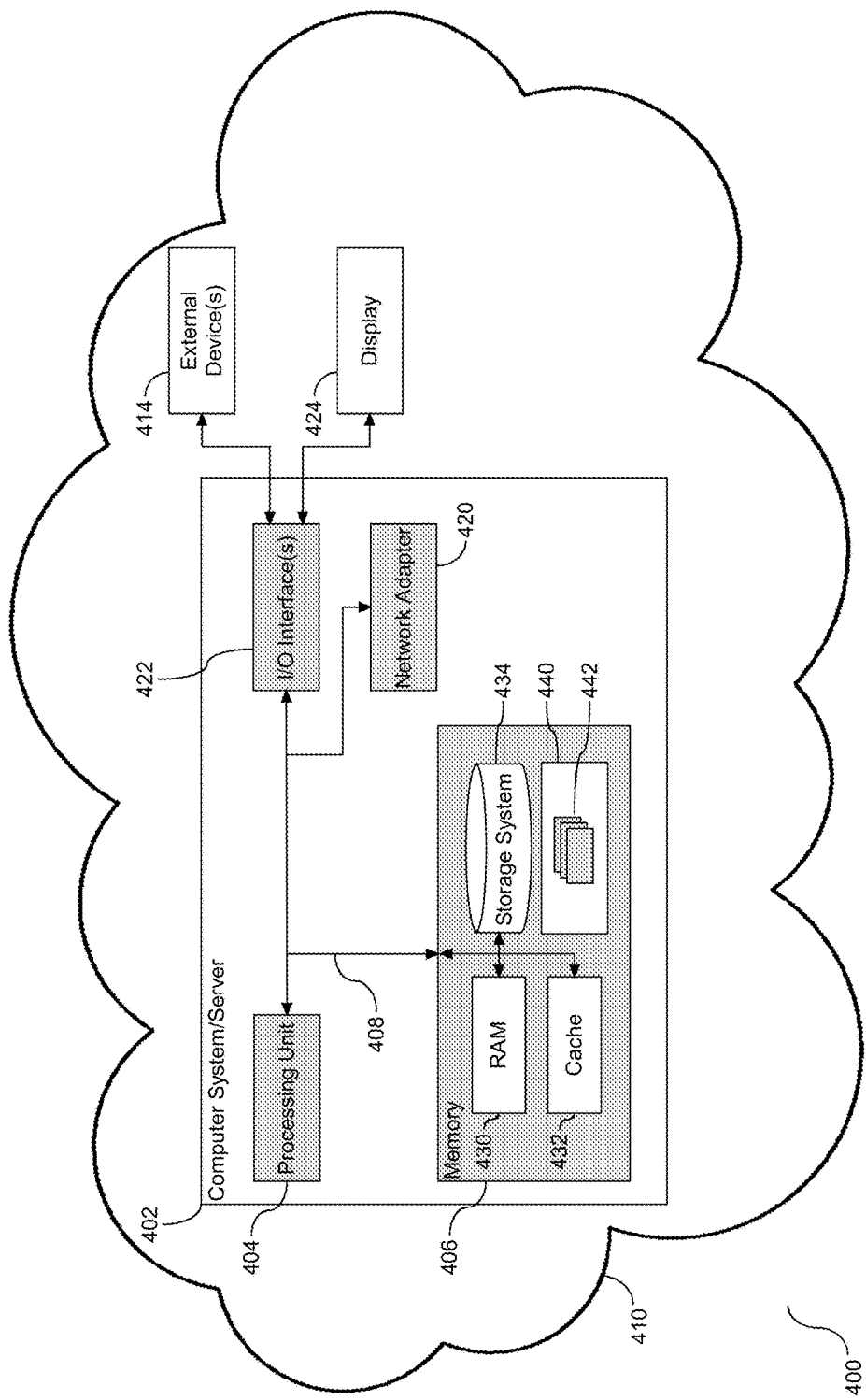
FIG. 4 depicts a block diagram illustrating an example of a computer system/server of a cloud based support system, to implement the system and process described with respect to FIGS. 1-3.

As shown in FIG. 4, host (402) is shown in the form of a general-purpose computing device. The components of host (402) may include, but are not limited to, one or more processors or processing units (404), a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to store and analyze data. For example, the set of program modules (442) may include the modules configured as the SDS interface in order to provide direct management of data storage as shown and described in FIGS. 1-3.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In one embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium includes a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium is any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (402) is a node (410) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
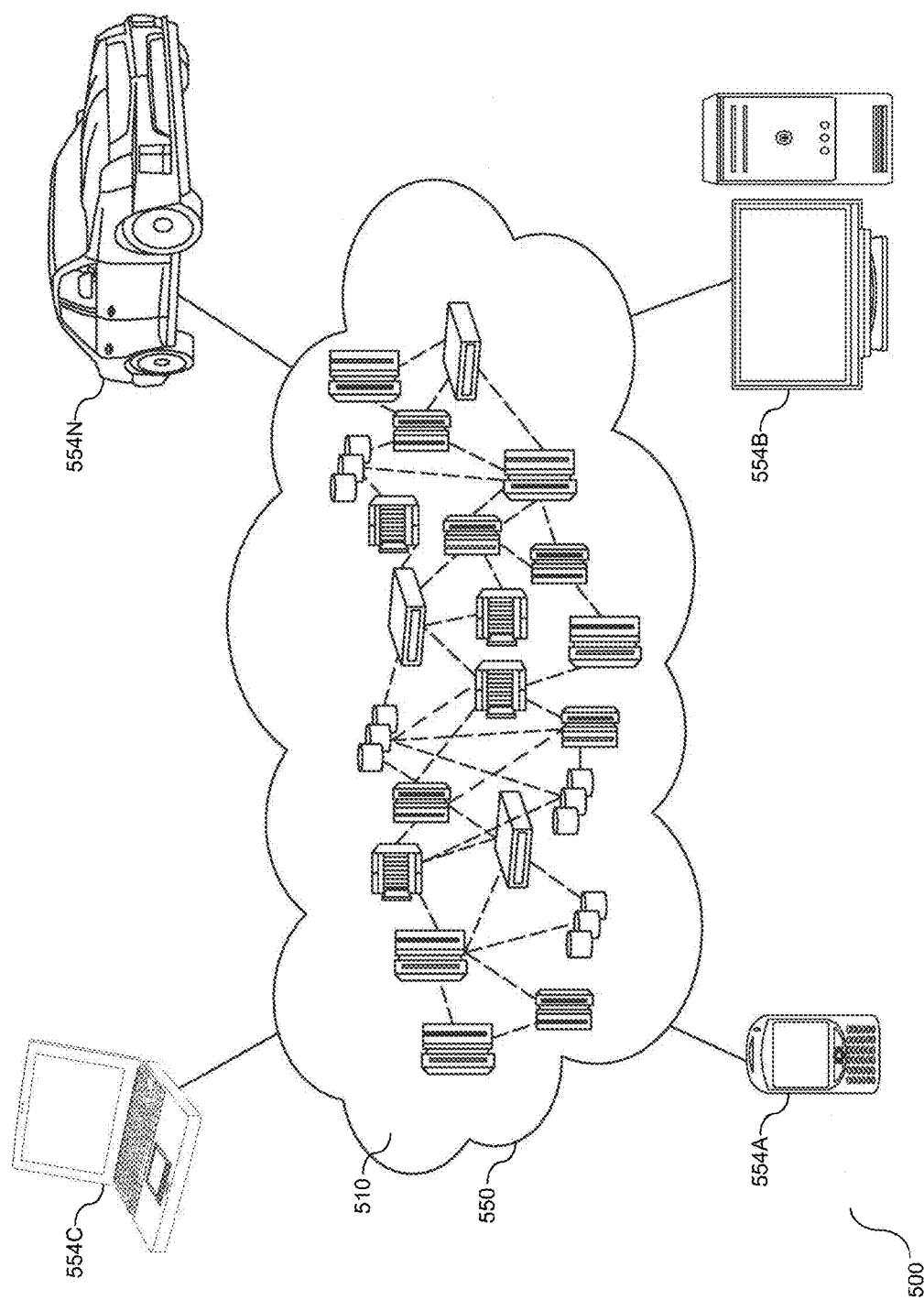
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (550) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
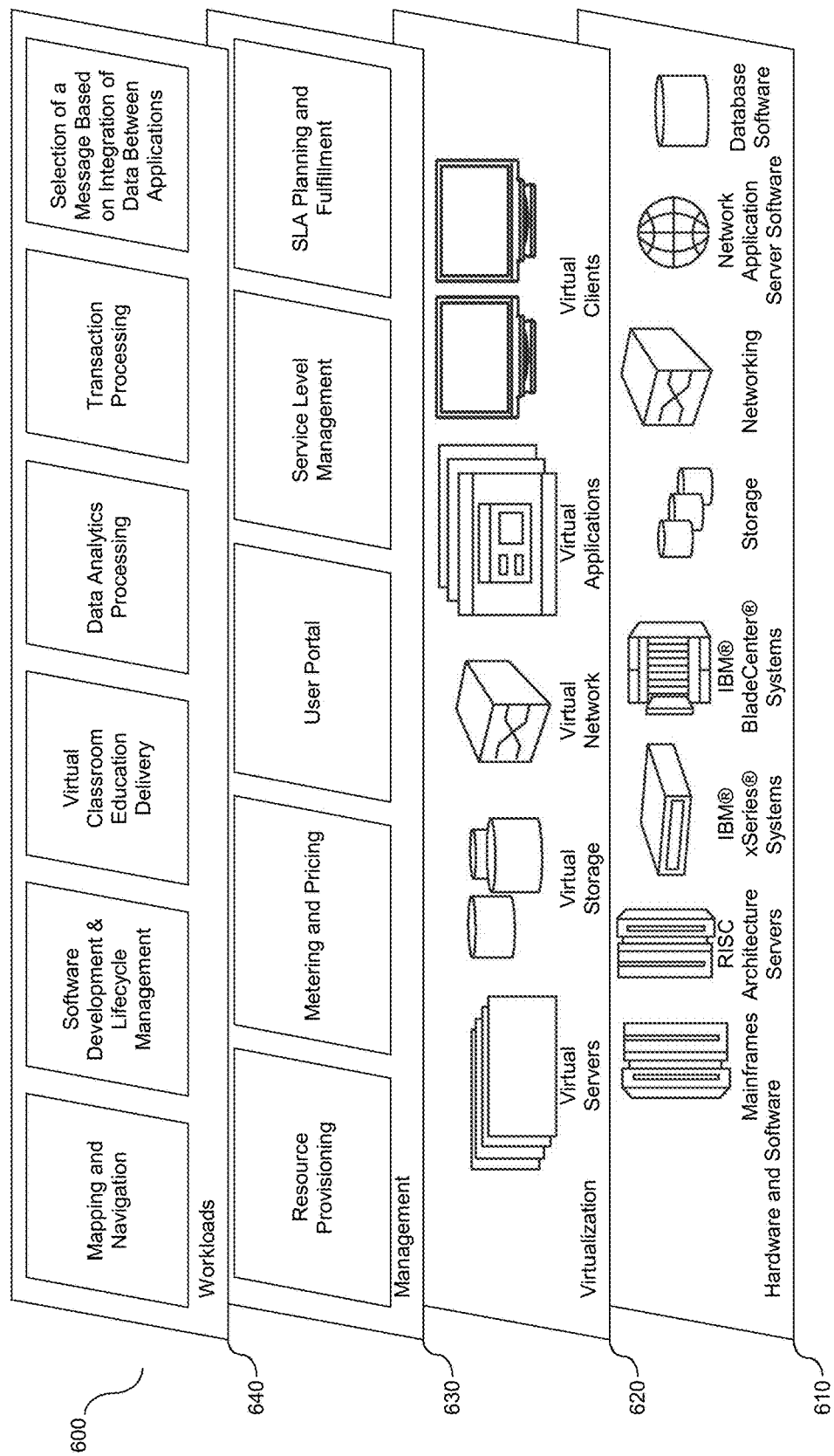
FIG. 6 depicts a block diagram illustrating a set of functional abstraction model layers provided by the cloud computing environment.

Referring now to FIG. 6, a set of functional abstraction layers provided by the cloud computing network of FIG. 4 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640). The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and selection and transmission of a message based on data integrated from two applications. Accordingly, the message selector shown and described in FIGS. 1-3 may be embodied in the functionality of the workload layer.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Selection of a message based on data integrated from two applications storage provides contextually relevant message presentation.

It will be appreciated that, although specific embodiments have been described herein for purposes of illustration, various modifications may be made without departing from the spirit and scope of the embodiments. In particular, the type and quantity of data stored should not be considered limiting. Additionally, the application types should not be considered limiting. Accordingly, the scope of protection of these embodiments is limited only by the following claims and their equivalents.

What is claimed is:

1. A computer system comprising:
  a processing unit in communication with a memory;
  a message selector in communication with the processing unit, the message selector to:
    integrate data from a first and a second application on a first device utilizing an authentication token including the message selector to:
      gather route traversal information in real-time from the first application, including utilizing the token to access the route traversal information and extract a current location associated with the first device; and
      gather profile data associated with the second application on the first device utilizing the token to access the profile data;
    responsive to a real-time message request associated with the second application, interrogate a data storage having one or more messages;
    select, in real-time, a first message from the interrogated data storage based on the message request, the route traversal information, and the profile data; and
    transmit the selected message to a select device selected from the group consisting of: the first device and a second device; and
  the select device to present the selected first message in the second application.

2. The system of claim 1, further comprising:
  the second device to identify a first event selected from the group consisting of: a keyword, a current location of the second device, a time interval, and a speed of the second device; and
  the second device to transmit the real-time message request to the message selector to perform the interrogation responsive to the first event, wherein the real-time message request includes the first event.

3. The system of claim 2, further comprising:
  the second device to identify a second event;
  wherein the real-time message request includes the second event; and
  wherein selection of the first message further comprises the message selector to:
    rank the one or more messages based on the route traversal information, the profile data, and the real-time message request;
    determine a relevant message based on the ranking; and
    select the relevant message as the first message.

4. The system of claim 3, wherein the selected first message includes a coupon having an advertisement identifier.

5. The system of claim 4, wherein the second application is a music streaming service and the first application is a physical route navigating service.

6. The system of claim 2, wherein the route traversal information includes a location selected from the group consisting of: a source location, a target location, a selected path from the source location to the target location, a re-routed path from a second location to the target location, and combinations thereof, and the profile data includes at least one characteristic selected from the group consisting of: a demographic, a previous location, and a preferred location.

7. The system of claim 1, wherein the presentation of the selected first message is selected from the group consisting of: audio, visual, haptic, and a combination thereof.

8. A computer program product for integrating data from two or more applications for message selection and presentation, the computer program product comprising a computer readable storage device having program code embodied therewith, the program code executable by a processing unit to:
  integrate data from a first and a second application on a first computing device utilizing an authentication token including program code to:
    gather route traversal information in real-time from the first application, including utilizing the token to access the route traversal information and extract a current location associated with the first computing device; and
    gather profile data associated with the second application on the first computing device utilizing the token to access the profile data;
  responsive to a real-time message request associated with the second application, interrogate a data storage having one or more messages;
  select, in real-time, a first message from the interrogated data storage based on the message request, the route traversal information, and the profile data;
  transmit the selected first message to a select computing device selected from the group consisting of: the first computing device and a second computing device; and
  present the selected first message in the second application on the select computing device.

9. The computer program product of claim 8, further comprising program code to:
  identify a first event selected from the group consisting of: a keyword, a current location of the second computing device, a time interval, and a speed of the second computing device; and
  transmit the real-time message request, from the second computing device, to a message selector to perform the interrogation responsive to the first event, wherein the real-time message request includes the first event.

10. The computer program product of claim 9, further comprising program code to:
  identify a second event on the second computing device;
  wherein the real-time message request includes the second event; and wherein selection of the first message further comprises the program code to:
rank the one or more messages based on the route traversal information, the profile data, and the real-time message request;
determine a relevant message based on the ranking; and
select the relevant message as the first message.

11. The computer program product of claim 10, wherein the selected first message includes a coupon having an advertisement identifier.

12. The computer program product of claim 11, wherein the second application is a music streaming service and the first application is a physical route navigating service.

13. The computer program product of claim 9, wherein the route traversal information includes a location selected from the group consisting of: a source location, a target location, a selected path from the source location to the target location, a re-routed path from a second location to the target location, and combinations thereof, and the profile data includes at least one characteristic selected from the group consisting of: a demographic, a previous location, and a preferred location.

* * * * *